United States Patent [19]

Goldman

[11] 3,860,524
[45] Jan. 14, 1975

[54] HIGH PERMEABILITY MANGANESE-ZINC FERRITES

[75] Inventor: Alex Goldman, Butler, Pa.

[73] Assignee: Spang Industries, Inc., Butler, Pa.

[22] Filed: June 2, 1972

[21] Appl. No.: 259,032

Related U.S. Application Data

[63] Continuation of Ser. No. 888,912, Dec. 29, 1969, abandoned.

[52] U.S. Cl. .............................................. 252/62.62
[51] Int. Cl. ............................................. C04b 35/38
[58] Field of Search .................................... 252/62.62

[56] References Cited
UNITED STATES PATENTS

| | | | |
|---|---|---|---|
| 3,168,476 | 2/1965 | Moser et al. | 252/62.62 |
| 3,252,913 | 5/1966 | Van Gils et al. | 252/62.62 |
| 3,376,227 | 4/1968 | Van Driel et al. | 252/62.61 |
| 3,492,236 | 4/1970 | Greger | 252/62.62 |
| 3,565,806 | 2/1971 | Ross | 252/62.62 |

Primary Examiner—Jack Cooper
Attorney, Agent, or Firm—Shanley, O'Neil and Baker

[57] ABSTRACT

Miniature-sized, manganese-zinc ferrites of 5000, and higher, permeabilities with relative core loss factors of $10 \times 10^{-6}$, and lower, at 100 KHz are produced from high purity manganese, zinc and iron oxides which are milled to micron sizes, spray-dried to form spherical shapes, and sphere sizes selected for compaction. The compacted parts are plunged directly into a high temperature (1200° to 1450°) sintering environment. Sintering is carried out in atmospheric air in fifteen to ninety minutes. Cooling rate for the sintered parts is controlled from sintering temperature to about 1000°C. The cooling atmosphere is maintained substantially inert down to about 200°C.

8 Claims, No Drawings

HIGH PERMEABILITY MANGANESE-ZINC FERRITES

This application is a continuation of application Ser. No. 888,912, filed Dec. 29, 1969, now abandoned.

This invention is concerned with manufacture of manganese-zinc ferrites. In one of its more specific aspects the invention is concerned with manufacture of manganese-zinc ferrite cores of permeability and low loss factor. Further the invention is concerned with manufacture of such cores in miniature sizes.

Process steps in the manufacture of manganese-zinc ferrites have been firmly established for some time and generally follow teachings such as those set forth in the patent to Guillaud U.S. Pat. No. 2,886,529 of May 12, 1959. Sintering steps in conventional manufacture of manganese ferrites are extended usually requiring a total time of about 12 hours with a period of some 8 hours being set for gradual heating to sintering temperature followed by approximately 4 hours at sintering temperature. The amount of oxygen is controlled throughout and is critical in the latter stages of sintering being held to a value between about 0.01% to about 1.2% by volume. Cooling time after sintering has normally extended over about a 15 hour period. Further the furnace used for such prior art processing must be fluid-tight throughout the process so that its atmosphere can be exactly controlled. Notwithstanding precise following of the lengthy and costly procedures discussed above it has not been possible to produce minimized sized cores of high permeability.

It is the primary objective of the present invention to provide a novel method for the manufacture of miniature-sized manganese-zinc ferrites of novel high permeability and low loss factor characteristics while eliminating the exacting requirements of the furnace during the extended heat-up and soak times of the prior art. The invention makes possible by mass-production batch methods the manufacture of cores of 0.250 inch and smaller outer dimension with permeabilities above 5000 and loss factors (1/MuQ) of $10 \times 10^{-6}$, and lower, at a frequency of 100 kilo-Hertz. In the formula 1/MuQ, Mu is the initial permeability and Q is the quality factor which is equal to a ratio of the inductive reactance and the loss resistance.

In carrying out the process, high purity metallic oxides are utilized in the following ranges:
  about 24 to about 30 mol per cent MnO,
  about 18 to about 24 mol per cent ZnO, and
  the balance consisting essentially $Fe_2O_3$.
Preferably the manganese oxide is about 27 mol per cent, the zinc oxide about 21 mol per cent, and the balance ferric oxide. A specific preferred embodiment is 26.88 mol per cent manganese oxide, 20.88 mol per cent zinc oxide, and 52.27 mol per cent ferric oxide.

The metallic oxide ingredients are mixed thoroughly and partially milled, at least to the extent of breaking up agglomerates. The mixture is calcined.

Preferably the manganese oxide is added as manganese carbonate. The mixed oxides are calcined at about 850°C. to about 1000°C. The calcining promotes more complete reaction of the metallic oxides and reduces shrinkage during the subsequent sintering operation.

The calcined ingredients are then milled to pulverant form such that at least 50% of the pulverant particles are 1 micron or smaller in size and less than 1% of the pulverant particles are near 5 microns in size. Preferably the milling is carried out in a wet process containing about 30%, by weight, water.

In order to obtain the high permeabilities and low loss factors described it is important that high purity metallic oxides be selected. The ferrite ingredients are selected so that the impurity content is less than about 0.05%. Additions of small percentages of calcium has been practiced in prior manufacture of manganese ferrites but this practice has not been found necessary in order to obtain the high permeability and low loss factor of the present invention.

However, non-reacting additions are made for physical reasons. For example, early in the ball milling process a deflocculent is added for the purpose of permitting work with a high percentage of solids while maintaining slurry handling conditions. Solid percentages of 70–80% are practicable due to the use of a deflocculent. Such high percentage of solids provides optimum sizing during the spray-drying step described later. A typical deflocculent is ammonium lignosulfate. About one-half of 1% by weight of the solid ingredients of this deflocculent is added. Other lignosulfates, such as metallic salts can function as deflocculents but the metallic residues must be considered in such other choices.

Immediately prior to the completion of the ball milling step a suitable binder and plasticizer are added. The binder helps in bringing about the desired agglomeration in the spray-drying process. The plasticizer is added for the purpose of softening the binder to aid compaction so that the spheres formed in spray-drying will deform during pressing.

A typical binder is polyvinyl alcohol which is added at about 1½% by weight of the solid materials. Polyethylene glycol 400 is a suitable plasticizer and is added at the rate of 1% by weight of the solid materials. Other suitable plasticizers include lower molecular weight polyethylene glycols. The binder and plasticizer are added late in the ball milling process to avoid foaming, but are added in sufficient time to assure proper mixing.

The wet mix is then spray-dried in air. In the spray-drying small spherical shapes are formed which, because of the high percentage of solids and the binder, provide ferrite material in proper concentration for optimum compaction and reaction. These spheres are then screened to sizes between about 120 and 325 mesh, eliminating particles larger than about 120 mesh and smaller than about 325 mesh. This size range facilitates proper density compaction and permits selection of sizes within this range. A number of factors are considered in selection of the sphere sizes. The small thickness of a toroidal part is considered in order to avoid bridging in the die. While relatively larger spheres facilitate flow for handling purposes, larger particles do not pack well tending to create too many voids. Smaller particles tend to entrap air.

Compaction or pressing into ferrite parts is carried out by standard pressing techniques. Either individual parts are pressed or multiple parts are pressed simultaneously. Pressing is carried out at the highest pressures available without laminating of the green part. Such pressures may extend to 20 tons per square inch.

Preliminary to actual sintering and separate from the ferrite reaction of the sintering operation, the binder added prior to spray-drying is burned off. This can be burned off at a temperature of about 650°C. in air and usually takes about 4 hours. Burning off the binder will also remove moisture from the core. However if the green pressed parts are stored for some time prior to sintering, the moisture should be driven off before the sintering operation. Moisture can be driven off at a temperature about the boiling point of water up to about 500°C. in 15 minutes or less in any suitable atmosphere, such as air. In these operations and other operations discussed later platinum foil contact surface for the parts is provided to avoid contamination of the parts. No heat treatment is involved and no chemical reaction takes place. Driving off moisture avoids possible blowing up of parts in the special sintering steps taught by the invention.

By prior practice, manganese-zince ferrites are raised to sintering temperature over about an 8 hour period under controlled, low oxygen conditions. By such practice, the maximum permeability of miniature-sized ferrite cores was substantially less than 3000, usually about 2000. This is believed to be due, at least in part, to the high ratio of surface area to volume of the miniature-sized parts which, in theory, contributes to the driving off of oxygen and over-densification.

The invention provides a number of unique features for overcoming these difficulties to produce miniature-sized parts of unique properties. One major departure from prior practice is plunging the parts directly into a high temperature sintering environment without controlled warm-up. Another is use of atmospheric air as a sintering atmosphere. Further the sintering or soak times are drastically reduced, in some instances to one-twentieth the time used in the prior art. The economies of these unusual steps are obvious.

In accordance with the teachings of the present invention the high temperature for the sintering environment is selected in the range of about 1200°C. to about 1450°C. with a preferred range of about 1325°C. to 1350°C.

With these teachings use of atmospheric air, and elimination of the prior exacting heat-up and soak controls, is made possible. Atmospheric air provides a suitable partial pressure for oxygen of about two-tenths atmosphere with the balance, nitrogen, being inert. The invention can be carried out with oxygen exerting about a two-tenths atmosphere partial pressure and by selecting an inert balance other than nitrogen. That is another inert gas or a vacuum can be substituted for the nitrogen. Such alternate atmospheres while not taking full advantage of the simplification and economy aspects of the invention, are set forth to help show the scope of the invention. Considering scope further, the oxygen content can vary, if desired, slightly above the 20% level of atmospheric air when sintering at temperatures approaching 1450°C. and higher. Also, the oxygen content can vary slightly below the 20% level of atmospheric air at the lower end of the sintering temperature ranges. In general however, the purposes of the invention are accomplished by sintering in atmospheric air.

Important to the concept is the direct plunging of the miniature-sized parts into the high temperature sintering environment. With the gaseous atmosphere exerting about two-tenths of an atmosphere oxygen, and the balance being inert, the partial pressure exerted by the oxygen is believed to be such that dynamic equilibrium exists between the oxygen content of the atmosphere and the oxygen content of the ferrite part throughout the heat treating process.

Another unusual aspect of the present invention is the sintering or soak times. Approximately 30 minute soak times are usual with the invention, however soak times can extend from about 15 minutes to about ninety minutes. After this relatively short duration sintering in a gaseous atmosphere exerting about two-tenths of an atmosphere partial pressure oxygen, the furnace is sealed and flushed with an inert gas, such as nitrogen. The atmosphere is then maintained substantially inert, for practical purposes less than about 0.1% oxygen, and the sintered parts are cooled in this substantially inert atmosphere to about 1000°C.

Cooling from a sintering temperature between about 1200°C. and about 1450°C. to a temperature about 1000°C. is carried out in about a half to about an hour's time. A cooling rate between about 5°C. and about 15°C. per minute is representative. After this relatively rapid cooling rate, the ferrite parts can be cooled at substantially any rate, for example at a furnace cooling rate. The atmosphere is controlled to be substantially inert between about 1000°C. and about 200°C. The parts can be cooled below the 200°C. level to ambient temperature in any suitable atmosphere, such as air. The parts are not removed from the substantially inert atmosphere substantially above 200°C. because of the possible skin effect, that is possible diffusion of oxygen into the skin of the part which can be accentuated because of the high ratio of surface skin to volume on the miniature-sized parts made in accordance with the invention.

Miniature-sized parts refers to parts in which the maximum external dimension is about 0.250 inch. Maximum external or outer dimension, as used, is a rectilinear dimension, for example a measurement of the outer diameter of a toroidal core, rather than a curvilinear measurement, such as the outer circumference of such a core.

Typically product of the present invention would be used in small transformers where inductance requirements make high permeability important because of the limited number of turns and small cross sections available. Pulse transformers are a typical usage and the cores would ordinarily have a toroidal shape. Outer diameters of 0.100 inch and 0.230 inch are standard sizes for these miniature toroidal cores. Such cores may vary from about 0.050 to about 0.150 inch in height with an inner diameter extending up to about 0.120 inch. Much smaller outer diameters form part of the invention and no limitation is placed on the range of part sizes in that direction however, the maximum external rectilinear dimension should be about 0.250 inch.

The result is a high permeability, miniature-sized ferrite with low relative loss factor. With the teachings of the invention toroidal cores of 0.100 inch and smaller OD's have been produced with permeabilities of 5000 to 10,000 and a relative loss factor (1/MuQ) of 10 × $10^{-6}$ at 100 KHz. Such high permeability and low loss factor ferrites have not been previously available in the art in small size cores.

A further advantageous result of the invention is that it lends itself to batch processing which is faster, produces better properties, and is easier to control than continuous processing. Extremely small cores are randomly stacked in trays for treatment. With the batch processing taught literally thousands of cores can be treated simultaneously with no handling difficulties and none of the costly equipment required for continuous processing of larger cores. The batch processing extends to rounding off of core edges. Toroidal cores can be tumbled, green or after sintering, to remove sharp edges.

It has been found to be important to rest the parts on platinum, or an equivalent non-reactive material, in the heat treatment of the miniature-sized parts considered. In the batch processing taught, containers for the parts are lined with platinum foil during heating and subsequent cooling of the parts. One advantage of platinum foil is that it can be extremely thin and is highly conductive. In effect, the platinum foil facilitates are practically instantaneous rise to sintering temperature of the parts. Non-reactive materials which are insulating in character are not as satisfactory as a non-reactive metallic foil such as platinum foil. Such foil serves two purposes in the firing stage, preventing contamination and facilitating rapid heating. Firing of these parts without this measure can adversely affect the results and the properties of the parts, causing a considerable decrease in permeability.

The rapid plunging into the high temperature sintering environment, as taught, facilitates uniform grain growth which is deemed to contribute to the high permeabilities and low losses obtained. With the long heat-up process of the prior art discontinuous grain growth may result or a duplex structure of very large and very small grains may result. Since air provides a suitable partial pressure of oxygen for the process, the furnace tightness requirements during heat-up and soak times are not critical as in the prior art. Also because of the relatively short sintering time, there is less opportunity for the ferrite parts to be contaminated by residual gases in the furnace refractories, and the like. The possibility of such contamination would be accentuated with the long sintering times of the prior art because of the large surface area to volume ratios of the miniature-sized parts produced in accordance with the invention.

Modification of the steps disclosed for purposes of describing a specific embodiment of the invention are possible in the light of the above teachings so that the scope of the invention is to be determined from the appended claims.

What is claimed is:

1. Method of manufacturing miniature sized manganese-zinc ferrite cores having a permeability in the range of 5,000 to 10,000 and loss factor (1/MuQ) of about $10 \times 10^{-6}$ at 100 KHz comprising mixing pulverant oxides of manganese, zinc, and iron in predetermined proportions in the range of 24 to 30 mol per cent manganese oxide, 18 to 24 mol per cent zinc oxide, and the balance consisting essentially of ferric oxide, compressing at least a portion of the mixed pulverant oxides to form a toroidal core of desired size having an external diameter in a range from about 0.10 inch to a maximum of 0.25 inch and a core height in the range of 0.05 to 0.150 inch directly plunging such compressed core into a high temperature sintering environment having a temperature between 1200°C. and about 1450°C. to substantially instantaneously raise the compressed core to sintering temperature, sintering the compressed product in a high temperature gaseous atmosphere at about 1200°C. to about 1450°C. for about 30 minutes, the high temperature gaseous atmosphere exerting a partial pressure of about two-tenths atmosphere oxygen, with the balance being substantially inert, then controllably cooling the sintered core at a rate between about 5°C. and 15°C. per minute in a substantially inert atmosphere to a temperature about 1000°C., and then continuing cooling in a substantially inert atmosphere to about 200°C.

2. The method of claim 1 in which the pulverant metallic oxides are selected to have about 27 mol per cent manganese oxide, about 21 mol per cent zinc oxide, and about 52 mol per cent ferric oxide.

3. The method of claim 1 in which the sintering temperature is selected to be between about 1325°C. and about 1350°C.

4. The method of claim 1 in which the impurity content of the pulverant oxides is no greater than about 0.05%.

5. The method of claim 1 including the step of
   milling the pulverant oxides to a particle size of about 1 micron.

6. The method of claim 1 in which the pulverant oxides are mixed wet in a slurry containing about 30% by weight water and then spray-dried to form spherical shapes, followed by screening of the dry spherical shapes to sizes between about 120 mesh and 325 mesh prior to compressing the product.

7. The method of claim 1 in which heat treatment and subsequent cooling of compressed product are carried out with support surfaces contacted by the product being a material which is non-reactive and highly heat conductive to avoid contamination of the product and facilitate sintering.

8. A miniature-sized manganese-zinc ferrite pulse transformer core having a toroidal shape with a maximum external diameter of 0.25 inch and a maximum height of about 0.15 inch formed from manganese-zinc ferrite material, comprising 24 to 30 mol per cent manganese oxide, 18 to about 24 mol per cent zinc oxide, and the balance consisting essentially of ferric oxide;

such toroidal core having a maximum loss factor (1/MuQ) of $10 \times 10^{-6}$ at 100 KHz and a permeability in the range of 5,000 to 10,000.

* * * * *